US012806500B2

(12) United States Patent
Huang et al.

(10) Patent No.: US 12,806,500 B2
(45) Date of Patent: Nov. 24, 2026

(54) SPORT SIMULATION DEVICE

(71) Applicant: BENQ CORPORATION, Taipei (TW)

(72) Inventors: Chih-Pen Huang, New Taipei City (TW); Ying-Tso Chen, Taipei (TW)

(73) Assignee: BENQ CORPORATION, Taipei City (TW)

( * ) Notice: Subject to any disclaimer, the term of this patent is extended or adjusted under 35 U.S.C. 154(b) by 157 days.

(21) Appl. No.: 18/936,986

(22) Filed: Nov. 4, 2024

(65) Prior Publication Data

US 2025/0375688 A1 Dec. 11, 2025

(30) Foreign Application Priority Data

Jun. 11, 2024 (TW) ................................ 113121422

(51) Int. Cl.
*G06Q 30/02* (2023.01)
*A63B 69/36* (2006.01)
(Continued)

(52) U.S. Cl.
CPC .......... *A63B 69/36* (2013.01); *A63B 71/0622* (2013.01); *A63F 13/812* (2014.09); (Continued)

(58) Field of Classification Search
CPC ................ A63B 69/36; A63B 71/0622; A63B 2220/807; A63B 2225/20; A63F 13/812; A63F 2300/8011; G06V 40/23
See application file for complete search history.

(56) References Cited

U.S. PATENT DOCUMENTS 10,198,080 B1 * 2/2019 Worley, III ............. G06F 3/017
2011/0169746 A1 * 7/2011 Kitajima ................ G06V 40/28 345/173
(Continued)

FOREIGN PATENT DOCUMENTS

CN 205666911 U 10/2016
CN 109615665 B 2/2021

OTHER PUBLICATIONS

"AMPLUS begins exporting its new product FOCUS, which was unveiled at PGA Show 2023" (published Apr. 4, 2023 online at https://www.einpresswire.com/article/625945478/amplus-begins-exporting-its-new-product-focus-which-was-unveiled-at-pga-show-2023 ) (Year: 2023).*
(Continued)

*Primary Examiner* — James M Detweiler
(74) *Attorney, Agent, or Firm* — Winston Hsu

(57) ABSTRACT

A sport simulation device is applied to an external computer device and includes a projection module, a camera module, a transmission module and an operation processor. The projection module projects a projection image containing a command pattern onto a bearing surface. The camera module captures a top view image of a user standing on the bearing surface. The operation processor is electrically connected to the projection module, the camera module and the transmission module. The operation processor can analyze the top view image to contain a predefined feature relevant to the user, acquire a coordinate range of the command pattern within the projection image, and decide whether to transmit a control command of the command pattern to the external computer device via the transmission module in accordance with a comparison of the predefined feature and the coordinate range.

10 Claims, 4 Drawing Sheets

(51) Int. Cl.
*A63B 71/06* (2006.01)
*A63F 13/812* (2014.01)

(52) U.S. Cl.
CPC ..... *A63B 2220/807* (2013.01); *A63B 2225/20* (2013.01); *A63F 2300/8011* (2013.01)

(56) References Cited

U.S. PATENT DOCUMENTS

| | | | | |
|---|---|---|---|---|
| 2011/0254939 | A1* | 10/2011 | Kadantseva | F24C 15/2021 348/77 |
| 2019/0099655 | A1* | 4/2019 | Park | A63B 1/00 |
| 2019/0099681 | A1* | 4/2019 | Rico | A63F 13/90 |
| 2019/0121522 | A1* | 4/2019 | Davis | G06F 3/04845 |
| 2024/0149152 | A1* | 5/2024 | Keegan | A63F 13/21 |
| 2026/0158359 | A1* | 6/2026 | Kim | A63B 69/36 |

OTHER PUBLICATIONS

"The Club Keyboard Golf Simulator Control Box" (published Nov. 30, 2023 online athttps://mygaragegolfcom/blogs/buying-guides/the-club-keyboard-golf-simulator-control-box-full-review?srsltid=AfmBOornYV0Gm-JPZ_udSckfwolUIULlil7PGVCII8w79ObQdTz7KyMy ) (Year: 2023).*

* cited by examiner

SPORT SIMULATION DEVICE

BACKGROUND OF THE INVENTION

1. Field of the Invention

The present invention relates to a sport simulation device, and more particularly, to a sport simulation device of inputting a control command by a club.

2. Description of the Prior Art

With the advanced technology, indoor simulated sports have gradually become popular. For example, golf indoor simulation course is more well-known because its required venue is much smaller than the venue of the real golf course. The conventional golf indoor simulation course projects the course scene onto the projection screen in front of the user, and then analyzes position of the golf ball hitting the projection screen, so as to provide batting information of the user. The operation equipment of the conventional golf indoor simulation course is electrically connected to the computer device; the user has to use the operation interface, such as the keyboard or the mouse, of the operation equipment to input the control command for controlling the computer device, which may interrupt the batting process of the user. Therefore, design of a golf indoor simulation device of directly inputting the control command by the golf club is an important issue in the sport apparatus industry.

SUMMARY OF THE INVENTION

The present invention provides a sport simulation device of inputting a control command by a club for solving above drawbacks.

According to the claimed invention, a sport simulation device is applied to an external computer device and includes a projection module, a camera module, a transmission module and an operation processor. The projection module is adapted to project a projection image containing at least one command pattern onto a bearing surface. The projection module is adapted to project a projection image containing at least one command pattern onto a bearing surface. The operation processor is electrically connected with the projection module, the camera module and the transmission module. The operation processor is adapted to analyze the top view image for acquiring a predefined feature relevant to a target object of the user, acquire a coordinate range of the at least one command pattern within the projection image, and decide whether to transmit a control command of the at least one command pattern to the external computer device via the transmission module in accordance with a comparison result of the predefined feature and the coordinate range.

According to the claimed invention, the sport simulation device further includes a distance sensor adapted to acquire a distance of the projection module relative to the bearing surface via time delay between an emitting point of time and a receiving point of time of a detection beam from the projection module, and the operation processor is adapted to further execute projection correction on the projection image based on the distance. The sport simulation device further includes a case, the camera module and the projection module are integrated inside the foresaid same case. The target object is a golf club held by the user, and the predefined feature is a club head of the golf club.

The sport simulation device of the present invention can utilize the projection module to project the course scene and the projection image with the command pattern respectively onto the bearing surface and the projection wall, and the camera module can capture the top view image of the user standing by the projection image. The camera module can be designed as a color sensor, and the operation processor can acquire image information about the user and related environment for auxiliary computation in accordance with the top view image provided by the color sensor. In addition, the operation processor can preferably use the object identification technology or the convolutional neural network to search the predefined feature of the target object from the top view image, and decide whether the user operates the target object to point towards the specific command pattern in accordance with an overlap result of the predefined feature of the target object and the coordinate range of the command pattern. Therefore, the user does not need to free his hands during the batting process; as long as the golf club is pointed towards the projection image on the bearing surface, the user can control the external computer device as if operating a virtual keyboard.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
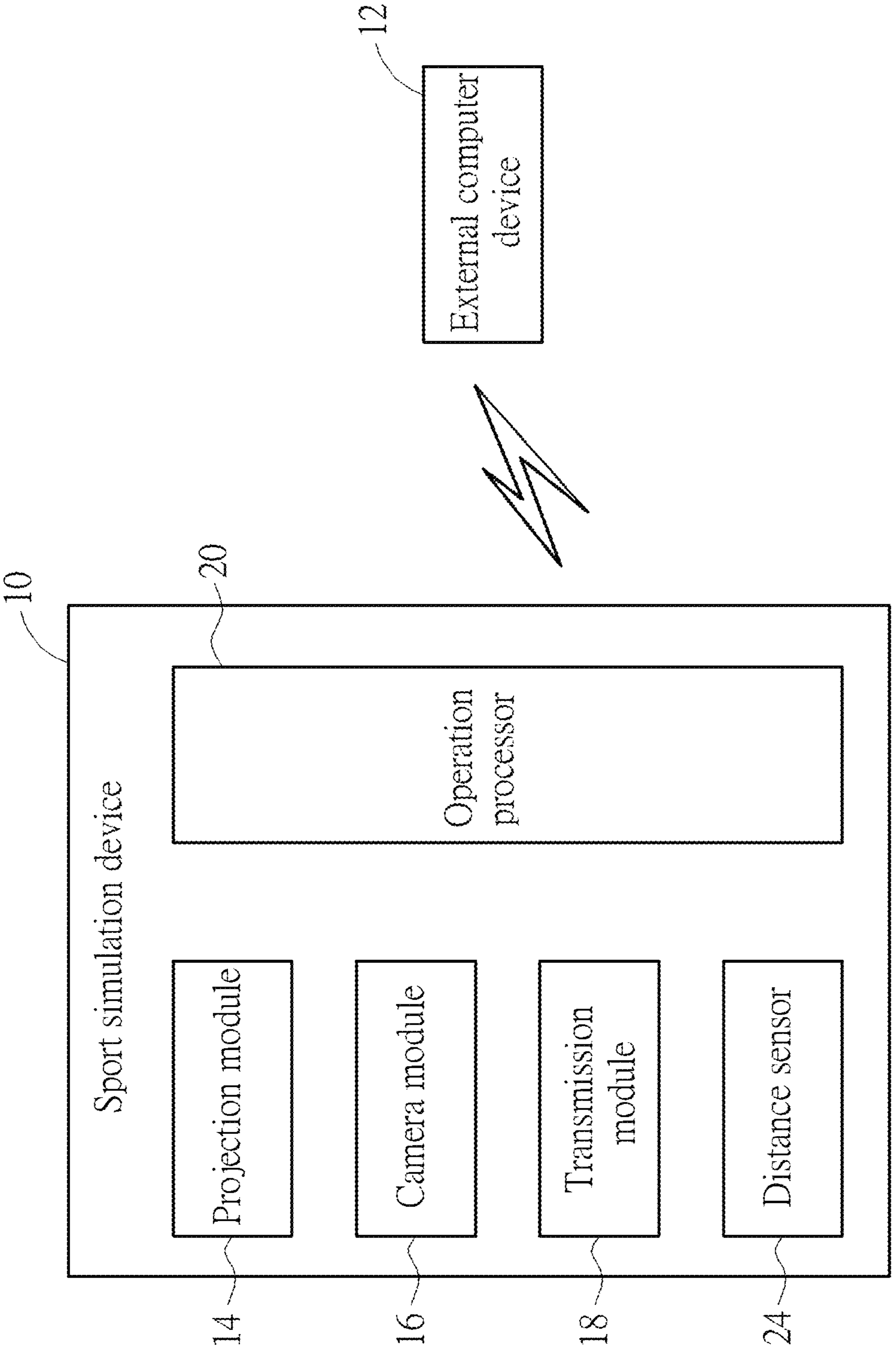
FIG. 1 is a functional block diagram of a sport simulation device according to an embodiment of the present invention.
Figure 2:
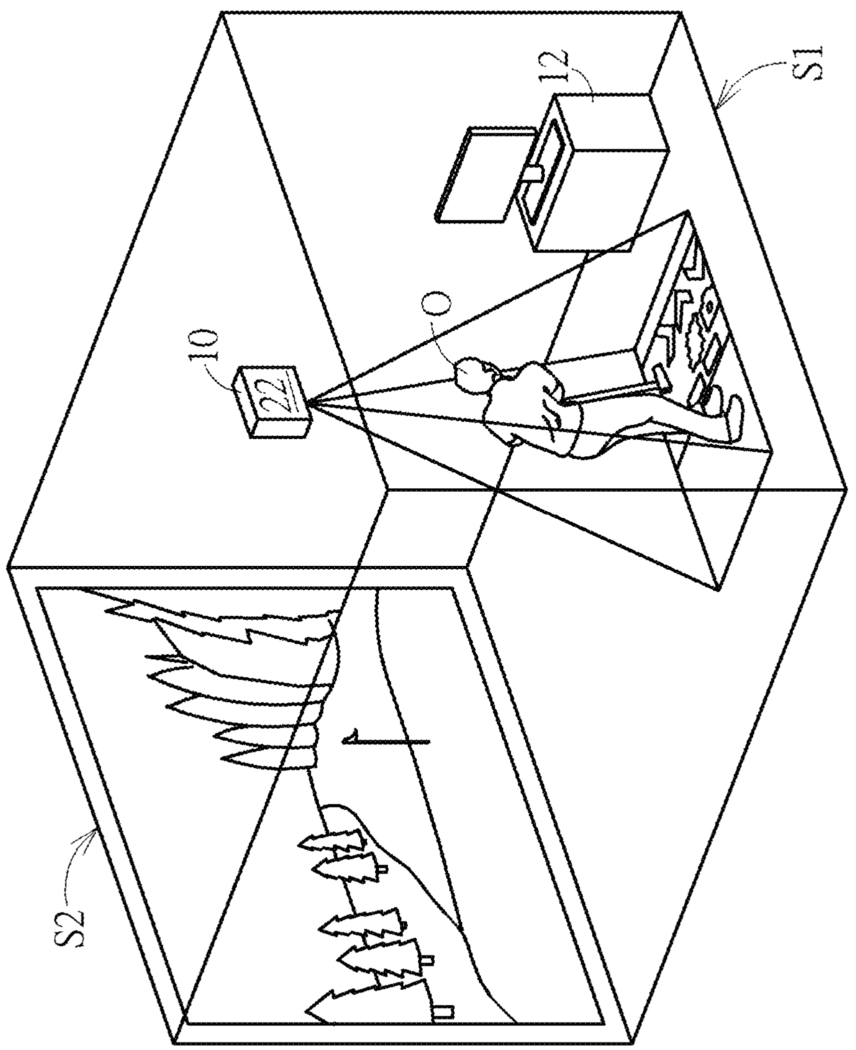
FIG. 2 is an application diagram of the sport simulation device according to the embodiment of the present invention.

Please refer to FIG. 1 and FIG. 2. FIG. 1 is a functional block diagram of a sport simulation device 10 according to an embodiment of the present invention. FIG. 2 is an application diagram of the sport simulation device 10 according to the embodiment of the present invention. In the present invention, the sport simulation device 10 can be a golf indoor simulation device applied to an external computer device 12. The external computer device 12 can be the desktop computer or the notebook computer, which depends on an actual demand. The sport simulation device 10 can be electrically connected with the external computer device 12 in a wired manner or in a wireless manner. The sport simulation device 10 can be a projection apparatus with a sport analysis function, which can analyze body posture of a user O, variation of a golf club, a batting result and/or a combination of foresaid information, and then transmit analysis results to the external computer device 12 for further process.

The sport simulation device 10 can include a projection module 14, a camera module 16, a transmission module 18 and an operation processor 20. The projection module 14 and the camera module 16 can be integrated into the same case 22 of the sport simulation device 10, so the sport simulation device 10 can be preferably located directly above the user O to project projection images with different content respectively onto the bearing surface S1 and the projection wall S2; an actual application of a projection manner of the sport simulation device 10 can depend on a design demand. For example, the sport simulation device 10 may be disposed on other position above the user O, and project the projection images with different content respectively onto the bearing surface S1 and the projection wall S2. As long as the sport simulation device 10 has the projection module 14 and the camera module 16 integrated inside the same case 22, the sport simulation device 10 can be placed on any position above the user O and therefore meet requirements of downward projection of the projection module 14 and downward shooting of the camera module 16 for conforming to the design scope of the present invention. The transmission module 18 and the operation processor 20 can be disposed inside the case 22 of the sport simulation device 10.

Figure 3:
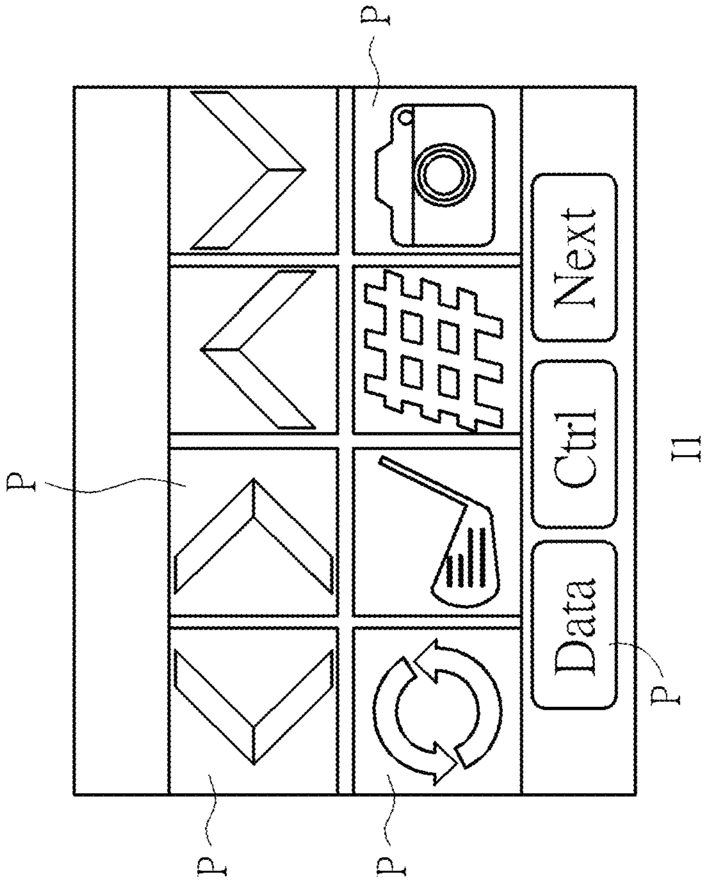
FIG. 3 is a diagram of a projection image provided by a projection module according to the embodiment of the present invention.
Figure 4:
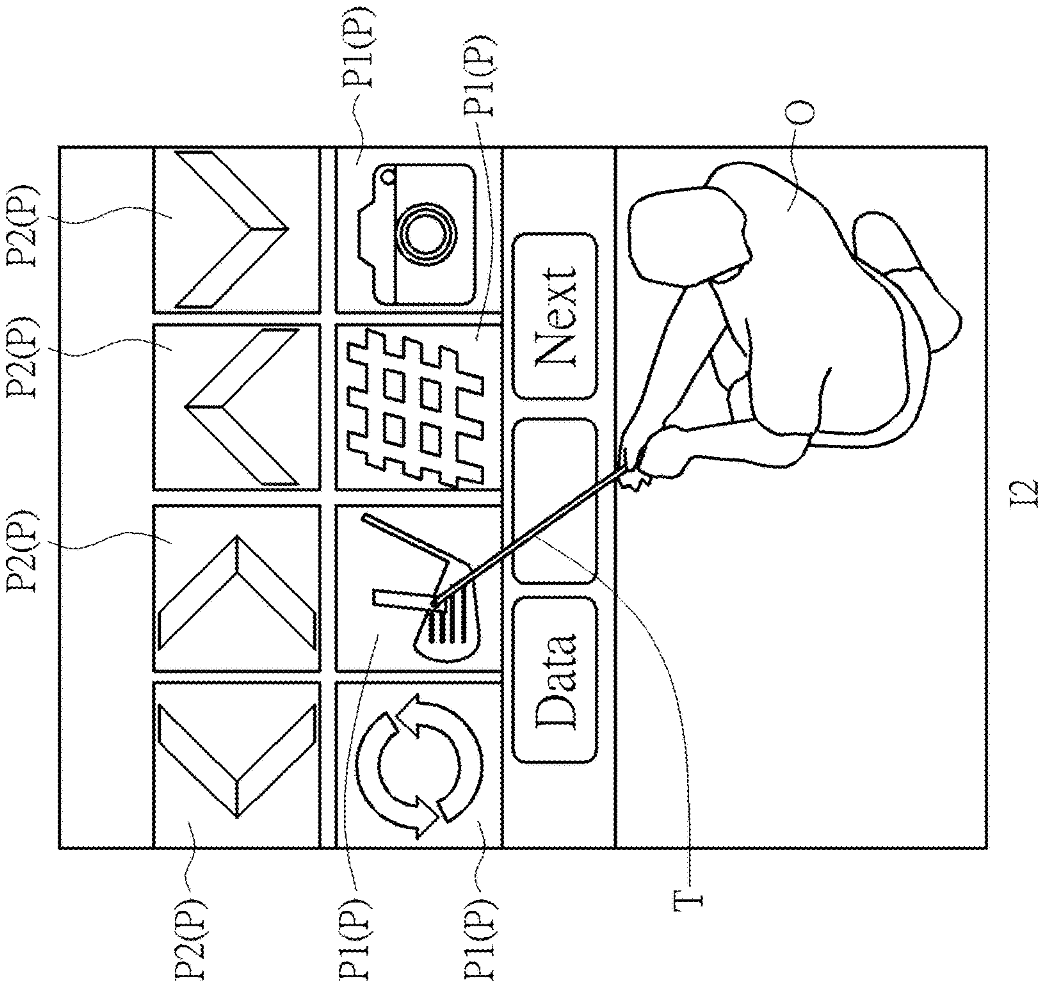
FIG. 4 is a diagram of a top view image generated by a camera module according to the embodiment of the present invention.

Please refer to FIG. 3 and FIG. 4. FIG. 3 is a diagram of a projection image I1 provided by the projection module 14 according to the embodiment of the present invention. FIG. 4 is a diagram of a top view image I2 generated by the camera module 16 according to the embodiment of the present invention. The projection module 14 can be a common projection apparatus, which can project a course scene onto the projection wall S2, and further can project the projection image I1 containing the command pattern P onto the bearing surface S1. The camera module 16 can have an image sensing component (which is not marked in the figures) used to capture the top view image I2 about the user O standing on the bearing surface S1. Generally, the user O can stand outside the projection image I1, and a target object T held by the user O can be placed into a vertical range of the projection image I1 (or can be interpreted as being placed above the projection image I1); position of the user O is not limited to the foresaid embodiment. The target object T can be a golf club or any other rod or stick held by the user O.

The operation processor 20 can be electrically connected with the projection module 14, the camera module 16 and the transmission module 18. The operation processor 20 can receive and analyze the top view image I2 to acquire a predefined feature relevant to the target object T of the user O, and further analyze the projection image I1 to acquire a coordinate range of a command pattern P within the projection image I1. In the embodiment of the present invention, the predefined feature can be a club head of the golf club, and the sport simulation device 10 can find out the predefined feature from the top view image I2 via object identification technology or convolutional neural network, or any applicable technology. The sport simulation device 10 does not need to search all features of the target object T, and does not need to draw a full outline of the target object T, but can only just find out the predefined feature roughly; the predefined feature is not limited to the club head of the golf club. Any feature that can be identified as the batting result of the golf club by the sport simulation device 10 can conform to definition of the foresaid predefined feature, and other possible features are not illustrated for simplicity.

Then, the operation processor 20 can compare the predefined feature with the coordinate range. If the predefined feature is located within the coordinate range, it indicates that the user O controls the predefined feature (which means the club head of the golf club) of the target object T to point towards the command pattern P, and the sport simulation device 10 can transmit the control command represented by the command pattern P to the external computer device 12 via the transmission module 18. If the predefined feature is located outside the coordinate range, it indicates that the user O controls the predefined feature (which means the club head of the golf club) of the target object T to be away from the command pattern P, and the sport simulation device 10 does not output the control command represented by the command pattern P.

The sport simulation device 10 can further include a distance sensor 24 electrically connected with the projection module 14 and the operation processor 20. The distance sensor 24 can be, but not be limited to, a time to flight (ToF) sensor. The distance sensor 24 can acquire time delay between an emitting point of time and a receiving point of time of a detection beam from the projection module 14. The operation processor 20 can compute a distance of the projection module 14 relative to the bearing surface S1 based on the foresaid time delay, and execute projection correction on the projection image I1 via the distance. When the distance between the projection module 14 and the bearing surface S1 is computed, the sport simulation device 10 can compute a required image size of the projection image I1 based on the distance, and decide the coordinate range of the command pattern P in accordance with the image size, so that the projection image I1 can be projected onto the bearing surface S1 with optimal resolution.

As shown in FIG. 3 and FIG. 4, the projection image I1 provided by the projection module 14 can optionally include a plurality of command patterns P. The sport simulation device 10 can compute relative positions and coordinate ranges of all the command patterns P in accordance with the required image size of the projection image I1; for example, an order of the command patterns P with different command contents, a result of whether all the command patterns P have the same size, or a result of whether a size of some command patterns P is greater than a size of other command patterns P can be determined for following selection and operation by the user. Each of the plurality of command patterns P can have its own specific coordinate range within the projection image I1, and the sport simulation device 10 can easily determine whether the predefined feature of the target object T is located within the specific coordinate range of each command pattern P.

It should be mentioned that when the projection image I1 contains the plurality of command patterns P, the sport simulation device 10 can further decide a movement trajectory and a dwelling period of the predefined feature on the target object T relative to the command patterns P. For example, if the user O moves the target object T across a first row of the commands pattern P1 to point towards a second row of the command patterns P2, the predefined feature of the target object T can briefly fall within the coordinate range of the command patterns P1 in the first row, and then leave the command patterns P1 in the first row and to move towards the coordinate range of the command patterns P2 in the second row. Therefore, the sport simulation device 10 can preferably determine whether the dwelling period of the predefined feature of the target object T within the coordinate range of some command patterns P exceeds a threshold value, so as to decide the predefined feature of the target object T passes through or stays on the foresaid command pattern P.

In conclusion, the sport simulation device of the present invention can utilize the projection module to project the course scene and the projection image with the command pattern respectively onto the bearing surface and the projection wall, and the camera module can capture the top view image of the user standing by the projection image. The camera module can be designed as a color sensor, and the operation processor can acquire image information about the user and related environment for auxiliary computation in accordance with the top view image provided by the color sensor. In addition, the operation processor can preferably use the object identification technology or the convolutional neural network to search the predefined feature of the target object from the top view image, and decide whether the user operates the target object to point towards the specific command pattern in accordance with an overlap result of the predefined feature of the target object and the coordinate range of the command pattern. Therefore, the user does not need to free his hands during the batting process; as long as the golf club is pointed towards the projection image on the bearing surface, the user can control the external computer device as if operating a virtual keyboard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sport simulation device applied to an external computer device, the sport simulation device comprising:

a projector adapted to project a projection image containing at least one command pattern onto a bearing surface;

a camera adapted to capture a top view image containing a user standing on the bearing surface and the projection image having the at least one command pattern;

a transmission module; and an operation processor electrically connected with the projector, the camera and the transmission module, the operation processor being adapted to analyze the top view image for acquiring a predefined feature relevant to a target object of the user, acquire a coordinate range of the at least one command pattern within the projection image, decide, according to a positional relationship between the predefined feature and the coordinate range, whether the predefined feature is applied for a command input corresponding to the at least one command pattern or for a sport analysis function, transmit a control command of the at least one command pattern to the external computer device via the transmission module in response to a decision that the predefined feature is applied for the command input, and transmit an analysis result to the external computer device via the transmission module in accordance with a decision that the predefined feature is applied for the sport analysis function.

2. The sport simulation device of claim 1, wherein the sport simulation device further comprises a distance sensor adapted to acquire a distance of the projector relative to the bearing surface via time delay between an emitting point of time and a receiving point of time of a detection beam from the projector, and the operation processor is adapted to further execute projection correction on the projection image based on the distance.

3. The sport simulation device of claim 2, wherein the operation processor is adapted to further compute an image size of the projection image in accordance with the distance, and decide the coordinate range of the at least one command pattern based on the image size.

4. The sport simulation device of claim 3, wherein the projector is adapted to project the projection image containing a plurality of command patterns, the operation processor is adapted to further decide a relative position and the coordinate range of each of the plurality of command patterns based on the image size.

5. The sport simulation device of claim 1, wherein the operation processor is adapted to further search the predefined feature from the top view image via object identification technology or convolutional neural network, so as to acquire relation between the predefined feature and the at least one command pattern for generating the comparison result.

6. The sport simulation device of claim 1, wherein the camera is a color sensor, the operation processor is adapted to further acquire image information about the user and related environment for auxiliary computation in accordance with the top view image provided by the color sensor.

7. The sport simulation device of claim 1, wherein the operation processor is adapted to further determine a movement trajectory and a dwelling period of the predefined feature relative to the at least one command pattern, so as to decide whether the predefined feature is within the coordinate range.

8. The sport simulation device of claim 1, wherein the camera and the projector are located directly above the user.

9. The sport simulation device of claim 1, wherein the sport simulation device further comprises a case, the camera and the projector are integrated inside the foresaid same case.

10. The sport simulation device of claim 1, wherein the target object is a golf club held by the user, and the predefined feature is a club head of the golf club.

* * * * *